United States Patent
Burns et al.

(10) Patent No.: US 12,118,182 B2
(45) Date of Patent: Oct. 15, 2024

(54) GENERATING SUGGESTED CONTENT FOR WORKSPACES

(71) Applicant: Apple Inc., Cupertino, CA (US)

(72) Inventors: Aaron M. Burns, Sunnyvale, CA (US); Scott M. Andrus, Santa Clara, CA (US); David M. Schattel, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/153,198

(22) Filed: Jan. 11, 2023

(65) Prior Publication Data

US 2023/0333712 A1    Oct. 19, 2023

Related U.S. Application Data

(63) Continuation of application No. PCT/US2021/041633, filed on Jul. 14, 2021.

(60) Provisional application No. 63/051,537, filed on Jul. 14, 2020.

(51) Int. Cl.
| | |
|---|---|
| *G06F 3/048* | (2013.01) |
| *G06F 3/01* | (2006.01) |
| *G06F 3/04815* | (2022.01) |
| *G06F 3/0482* | (2013.01) |

(52) U.S. Cl.
CPC ............ *G06F 3/0482* (2013.01); *G06F 3/013* (2013.01); *G06F 3/04815* (2013.01)

(58) Field of Classification Search
CPC ..... G06F 3/0482; G06F 3/04815; G06F 3/013
See application file for complete search history.

(56) References Cited

U.S. PATENT DOCUMENTS

| | | | |
|---|---|---|---|
| 5,861,867 A | 1/1999 | Ishikawa | |
| 10,504,290 B2* | 12/2019 | Rogers | G06F 3/0484 |
| 11,361,519 B1* | 6/2022 | Kanno | H04W 4/021 |
| 11,854,148 B2* | 12/2023 | Ghatak | G06Q 30/0255 |
| 2011/0138324 A1 | 6/2011 | Sweeney et al. | |
| 2013/0249948 A1* | 9/2013 | Reitan | G06T 19/00 345/633 |
| 2014/0063060 A1 | 3/2014 | Maciocci et al. | |
| 2014/0320389 A1 | 10/2014 | Scavezze et al. | |
| 2017/0139556 A1 | 5/2017 | Josephson | |
| 2017/0270715 A1 | 9/2017 | Lindsay et al. | |
| 2017/0337742 A1* | 11/2017 | Powderly | G06F 3/0482 |
| 2017/0371432 A1 | 12/2017 | Gavriliuc et al. | |
| 2018/0286126 A1* | 10/2018 | Schwarz | G06F 3/04845 |

(Continued)

FOREIGN PATENT DOCUMENTS

| | | |
|---|---|---|
| CN | 105190485 A | 12/2015 |
| CN | 111399714 A | 7/2020 |

(Continued)

OTHER PUBLICATIONS

International Preliminary Report on Patentability received for PCT Patent Application No. PCT/US2021/041633, mailed on Jan. 26, 2023, 12 pages.

(Continued)

*Primary Examiner* — Linh K Pham
(74) *Attorney, Agent, or Firm* — DLA Piper LLP (US)

(57) ABSTRACT

In accordance with some embodiments, an exemplary process for controlling the generation and display of suggested additional content based on a context of a workspace is described.

24 Claims, 8 Drawing Sheets

(56) References Cited

U.S. PATENT DOCUMENTS

| | | | |
|---|---|---|---|
| 2018/0307303 A1* | 10/2018 | Powderly | G02B 27/0172 |
| 2018/0315248 A1* | 11/2018 | Bastov | G06T 19/006 |
| 2019/0294314 A1* | 9/2019 | Tada | G06V 20/20 |
| 2020/0211288 A1 | 7/2020 | Woods et al. | |
| 2020/0225746 A1* | 7/2020 | Bar-Zeev | G06F 3/011 |
| 2020/0294316 A1 | 9/2020 | Ikeda et al. | |
| 2020/0379727 A1 | 12/2020 | Blatz et al. | |
| 2021/0365108 A1* | 11/2021 | Burns | G06F 3/013 |
| 2022/0292543 A1* | 9/2022 | Henderson | G06Q 30/0252 |

FOREIGN PATENT DOCUMENTS

| | | |
|---|---|---|
| CN | 108780358 B | 10/2021 |
| EP | 3624066 A2 | 3/2020 |
| JP | 5-342322 A | 12/1993 |
| JP | 2016-203792 A | 12/2016 |
| JP | 2020-42802 A | 3/2020 |
| WO | 2018/038136 A1 | 3/2018 |
| WO | 2019/067482 A1 | 4/2019 |
| WO | 2019/067902 A1 | 4/2019 |
| WO | 2019/069575 A1 | 4/2019 |

OTHER PUBLICATIONS

International Search Report and Written Opinion received for PCT Patent Application No. PCT/US2021/041633, mailed on Nov. 10, 2021, 16 pages.
Decision to Grant received for Japanese Patent Application No. 2021-561036, mailed on Jan. 9, 2024, 3 pages (1 page of English Translation and 2 pages of Official Copy).
Office Action received for Korean Patent Application No. 10-2021-7032913, mailed on Nov. 24, 2023, 5 pages (2 pages of English Translation and 3 pages of Official Copy).
International Preliminary Report on Patentability received for PCT Patent Application No. PCT/US2020/048833, mailed on Apr. 7, 2022, 16 pages.
International Search Report and Written Opinion received for PCT Patent Application No. PCT/US2020/048833, mailed on Nov. 24, 2020, 19 pages.
Office Action received for Japanese Patent Application No. 2021-561036, mailed on Aug. 24, 2022, 7 pages (4 pages of English Translation and 3 pages of Official Copy).
Applicant-Initiated Interview Summary received for U.S. Appl. No. 17/396,441, mailed on Jul. 20, 2023, 2 pages.
Corrected Notice of Allowance received for U.S. Appl. No. 17/396,441, mailed on Aug. 29, 2023, 2 pages.
Non-Final Office Action received for U.S. Appl. No. 17/396,441, mailed on May 9, 2023, 19 pages.
Notice of Allowance received for U.S. Appl. No. 17/396,441, mailed on Aug. 16, 2023, 9 pages.
Office Action received for European Patent Application No. 20772478.2, mailed on Mar. 28, 2023, 13 pages.
Office Action received for Japanese Patent Application No. 2021-561036, mailed on Mar. 1, 2023, 7 pages (4 pages of English Translation and 3 pages of Official Copy).
Office Action received for Korean Patent Application No. 10-2021-7032913, mailed on May 15, 2023, 14 pages (7 pages of English Translation and 7 pages of Official Copy).
Office Action received for Japanese Patent Application No. 2021-561036, mailed on Nov. 9, 2023, 4 pages (2 pages of English Translation and 2 pages of Official Copy).
Office Action received for Chinese Patent Application No. 202080027747.X, mailed on Mar. 15, 2024, 16 pages (7 pages of English Translation and 9 pages of Official Copy).
Office Action received for European Patent Application No. 20772478.2, mailed on Apr. 15, 2024, 6 pages.

* cited by examiner

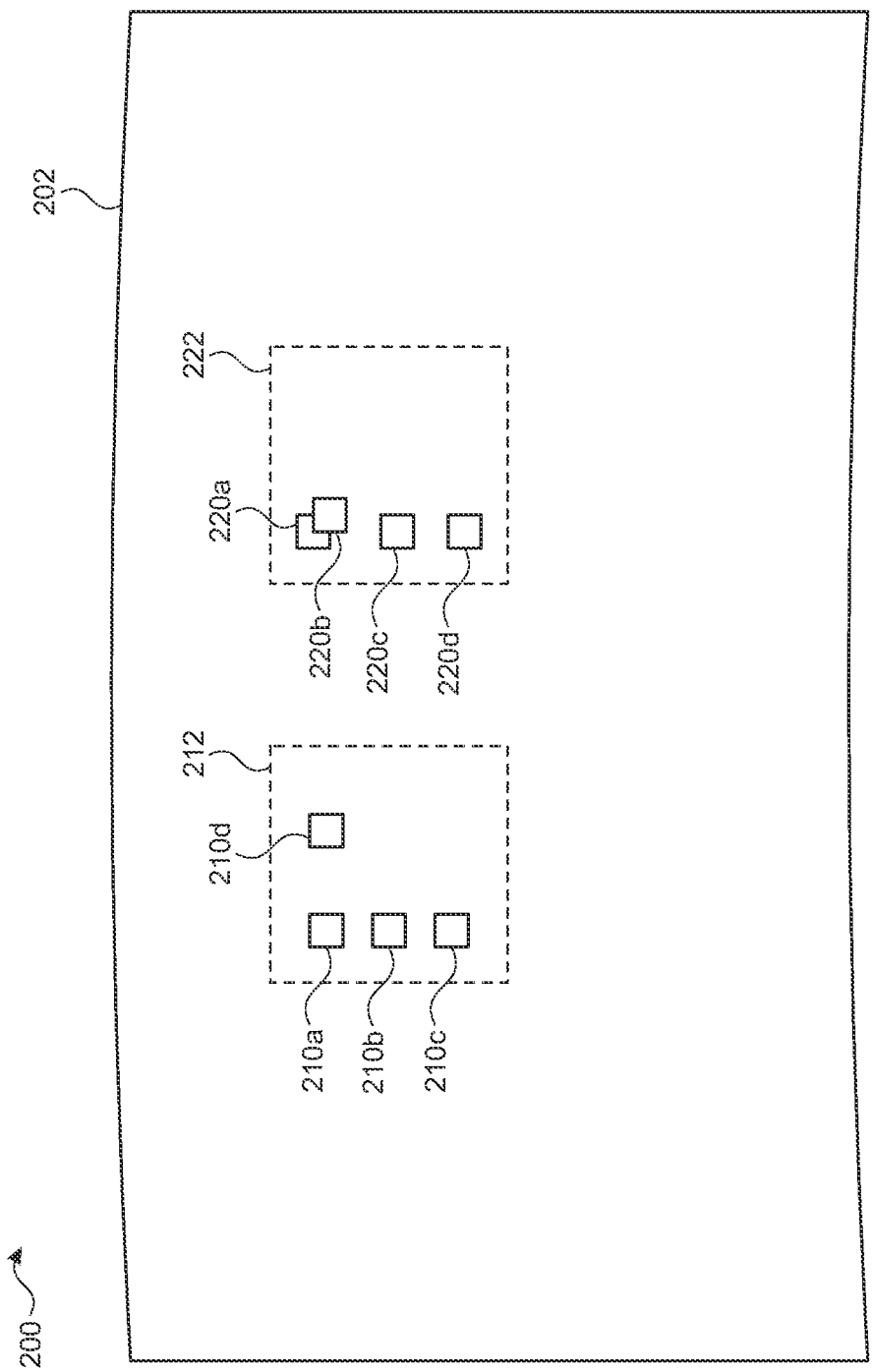

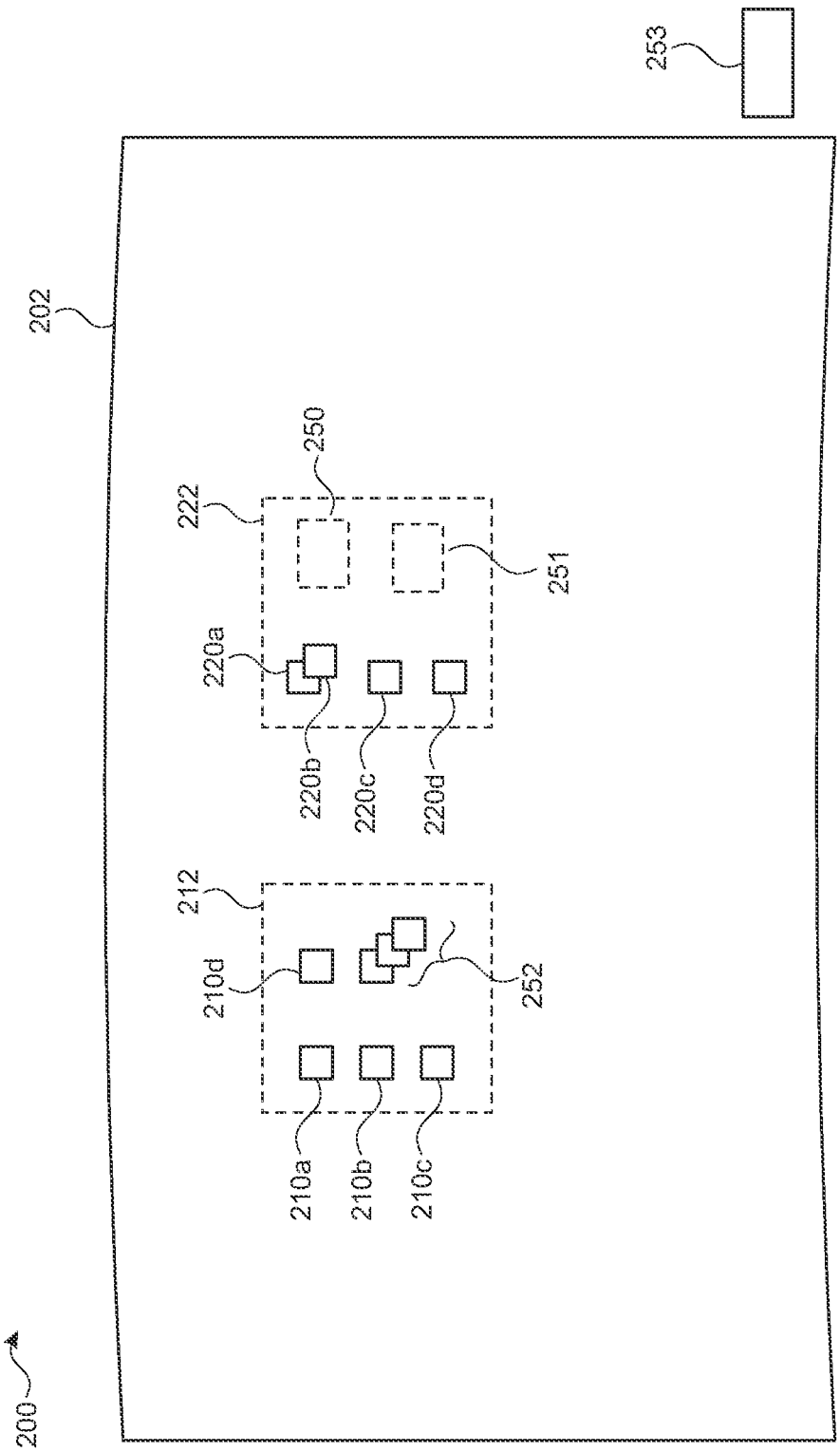

GENERATING SUGGESTED CONTENT FOR WORKSPACES

1. CROSS REFERENCE TO RELATED APPLICATIONS

This application is a continuation of PCT Application No. PCT/US21/41633, entitled "GENERATING SUGGESTED CONTENT FOR WORKSPACES," filed Jul. 14, 2021, which claims priority to U.S. Provisional Application No. 63/051,537, entitled "GENERATING SUGGESTED CONTENT FOR WORKSPACES," filed Jul. 14, 2020, the content of which is hereby incorporated by reference in its entirety for all purposes.

2. FIELD

The present disclosure relates generally to generating suggested content, and more specifically to generating suggested content for workspaces.

3. DESCRIPTION OF RELATED ART

Extended reality (XR) environments are environments where at least some objects displayed for a user's viewing are generated by a computer. In some implementations, an extended reality workspace may be used to present a collection of items of content. A user may interact with the workspace to organize the collection of items of content. However, some approaches suffer from a lack of robust functionality for controlling the generation and display of suggested additional content within XR environments.

BRIEF SUMMARY

In accordance with some embodiments, a method includes displaying, via a display of a wearable electronic device, a virtual representation of a workspace, wherein the virtual representation of the workspace includes a set of content displayed at a location in the virtual representation of the workspace, the set of content including one or more items of content; determining a context associated with the set of content based on a spatial characteristic of the one or more items of content with respect to the location of the set of content in the virtual representation of the workspace; and providing one or more candidate items of content, wherein the one or more candidate items of content are determined based on the context associated with the set of content of the virtual representation of the workspace.

In accordance with some embodiments, a wearable electronic device includes a display, one or more processors, and memory storing one or more programs configured to be executed by the one or more processors, the one or more programs including instructions for: displaying, via the display of the wearable electronic device, a virtual representation of a workspace, wherein the virtual representation of the workspace includes a set of content displayed at a location in the virtual representation of the workspace, the set of content including one or more items of content; determining a context associated with the set of content based on a spatial characteristic of the one or more items of content with respect to the location of the set of content in the virtual representation of the workspace; and providing one or more candidate items of content, wherein the one or more candidate items of content are determined based on the context associated with the set of content of the virtual representation of the workspace.

In accordance with some embodiments, a non-transitory computer-readable storage medium storing one or more programs configured to be executed by one or more processors of a wearable electronic device includes a display, the one or more programs including instructions for: displaying, via the display of the wearable electronic device, a virtual representation of a workspace, wherein the virtual representation of the workspace includes a set of content displayed at a location in the virtual representation of the workspace, the set of content including one or more items of content; determining a context associated with the set of content based on a spatial characteristic of the one or more items of content with respect to the location of the set of content in the virtual representation of the workspace; and providing one or more candidate items of content, wherein the one or more candidate items of content are determined based on the context associated with the set of content of the virtual representation of the workspace.

In accordance with some embodiments, a transitory computer-readable storage medium storing one or more programs configured to be executed by one or more processors of a wearable electronic device includes a display, the one or more programs including instructions for: displaying, via the display of the wearable electronic device, a virtual representation of a workspace, wherein the virtual representation of the workspace includes a set of content displayed at a location in the virtual representation of the workspace, the set of content including one or more items of content; determining a context associated with the set of content based on a spatial characteristic of the one or more items of content with respect to the location of the set of content in the virtual representation of the workspace; and providing one or more candidate items of content, wherein the one or more candidate items of content are determined based on the context associated with the set of content of the virtual representation of the workspace.

In accordance with some embodiments, a wearable electronic device includes a display, means for displaying, via the display of the wearable electronic device, a virtual representation of a workspace, wherein the virtual representation of the workspace includes a set of content displayed at a location in the virtual representation of the workspace, the set of content including one or more items of content; means for determining a context associated with the set of content based on a spatial characteristic of the one or more items of content with respect to the location of the set of content in the virtual representation of the workspace; and means for providing one or more candidate items of content, wherein the one or more candidate items of content are determined based on the context associated with the set of content of the virtual representation of the workspace.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

FIGS. 2A-2F depict exemplary techniques for providing content based on context in accordance with some embodiments.

Figure 1A:
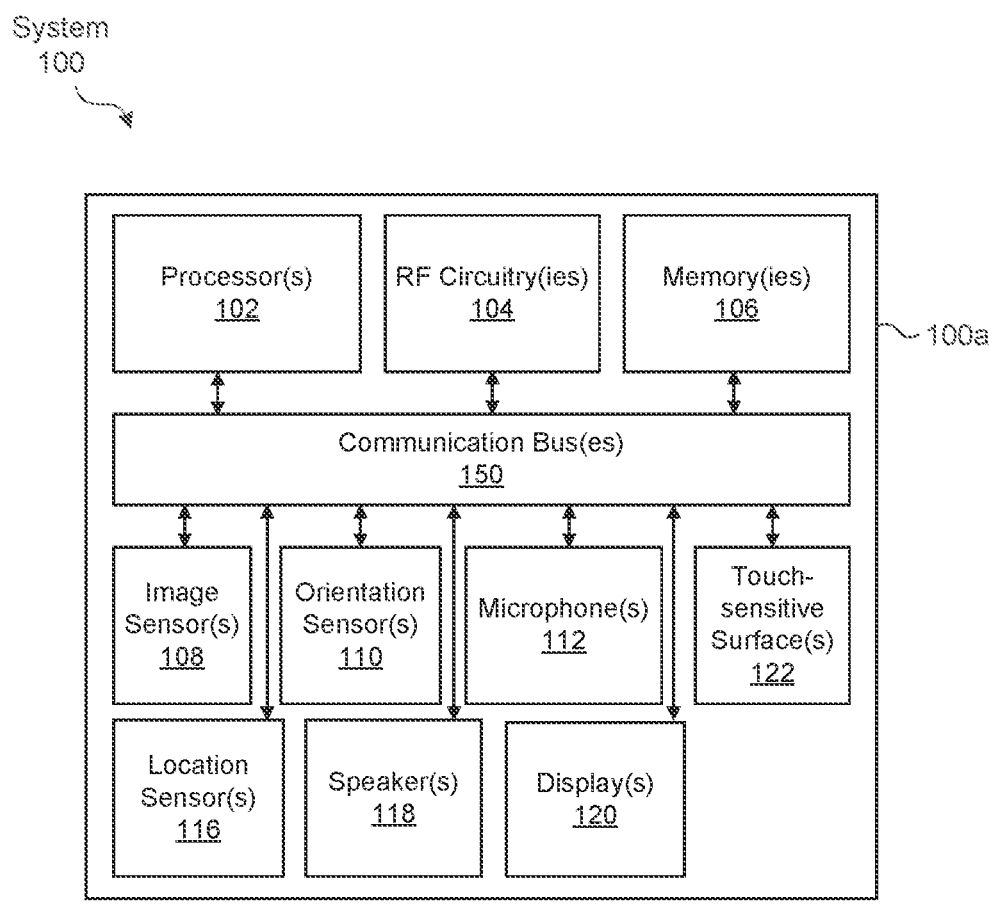
FIGS. 1A-1B depict exemplary systems for use in various extended reality (XR) technologies.

Various examples of electronic systems and techniques for using such systems in relation to various extended reality (XR) technologies are described.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell. In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 1B:
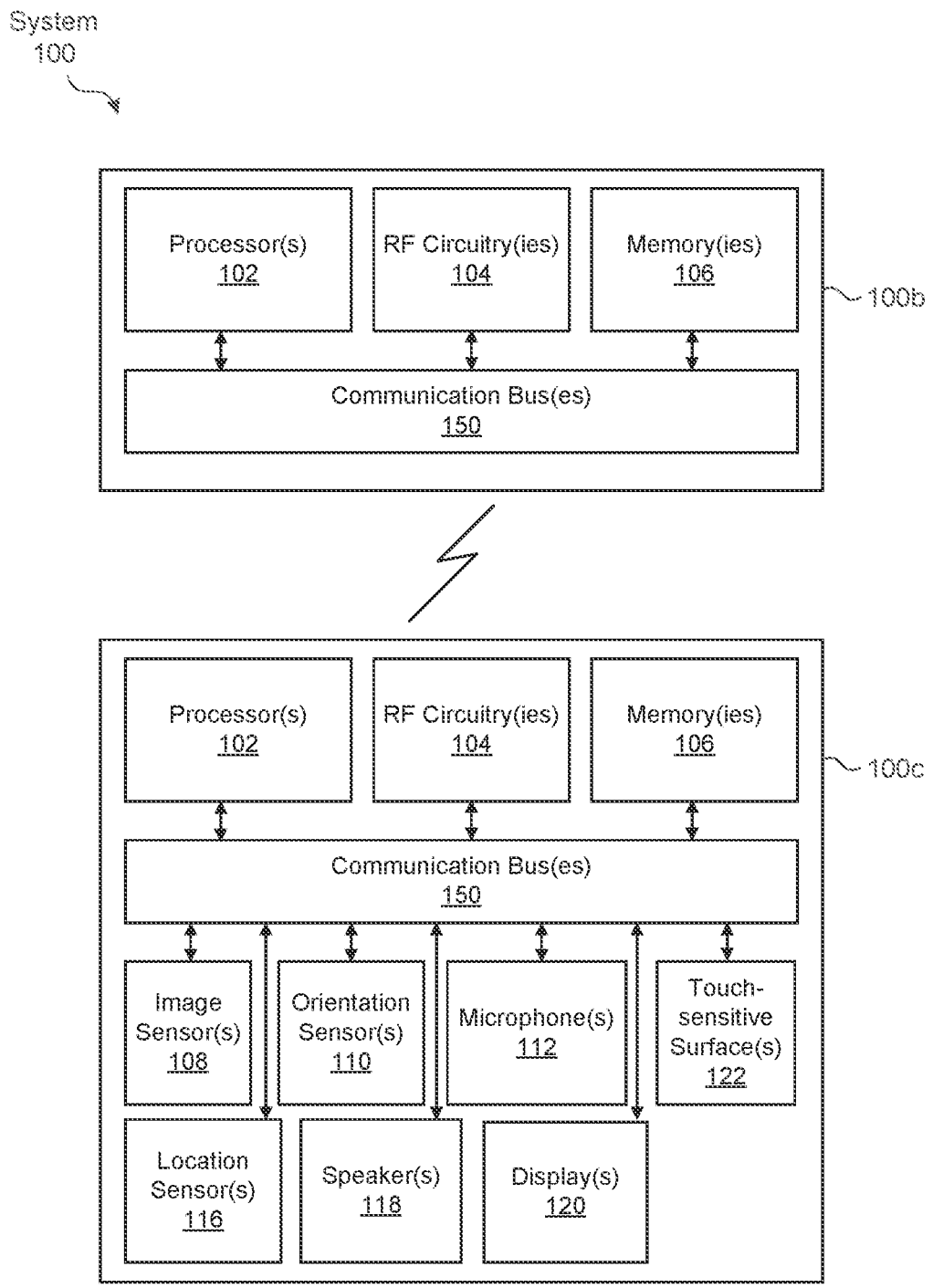

FIG. 1A and FIG. 1B depict exemplary system 100 for use in various XR technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor (s) 102, RF circuitry(ies) 104, and memory(ies) 106. These components optionally communicate over communication bus(es) 150 of device 100b. Second device 100c (e.g., a HMD) includes various components, such as processor(s) 102, RF circuitry(ies) 104, memory(ies) 106, image sensor (s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry (ies) 104 optionally include circuitry for communicating with electronic devices, networks, such as the Internet, intranets, and/or a wireless network, such as cellular networks and wireless local area networks (LANs). RF circuitry (ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective Display(s) 120 may have an opaque display. Display(s) 120 may have a transparent or semi-transparent display that may incorporate a substrate through which light representative of images is directed to an individual's eyes. Display(s) 120 may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one example, the transparent or semi-transparent display may transition selectively between an opaque state and a transparent or semi-transparent state. Other examples of display(s) 120 include heads up displays, automotive windshields with the ability to display graphics, windows with the ability to display graphics, lenses with the ability to display graphics, tablets, smartphones, and desktop or laptop computers. Alternatively, system 100 may be designed to receive an external display (e.g., a smartphone). In some examples, system 100 is a projection-based system that uses retinal projection to project images onto an individual's retina or projects virtual objects into a physical setting (e.g., onto a physical surface or as a holograph).

In some examples, system 100 includes touch-sensitive surface(s) 122 for receiving user inputs, such as tap inputs and swipe inputs. In some examples, display(s) 120 and touch-sensitive surface(s) 122 form touch-sensitive display (s).

System 100 includes image sensor(s) 108. Image sensor (s) 108 optionally include one or more visible light image sensor, such as charged coupled device (CCD) sensors, and/or complementary metal-oxide-semiconductor (CMOS) sensors operable to obtain images of physical elements from the physical setting. Image sensor(s) also optionally include one or more infrared (IR) sensor(s), such as a passive IR sensor or an active IR sensor, for detecting infrared light from the physical setting. For example, an active IR sensor includes an IR emitter, such as an IR dot emitter, for emitting infrared light into the physical setting. Image sensor(s) 108 also optionally include one or more event camera(s) configured to capture movement of physical elements in the physical setting. Image sensor(s) 108 also optionally include one or more depth sensor(s) configured to detect the distance of physical elements from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical elements in the physical setting from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the physical setting. For example, system 100 uses image sensor (s) 108 to track the position and orientation of display(s) 120 relative to one or more fixed objects in the physical setting.

In some examples, system 100 includes microphone(s) 112. System 100 uses microphone(s) 112 to detect sound from the user and/or the physical setting of the user. In some examples, microphone(s) 112 includes an array of microphones (including a plurality of microphones) that optionally operate in tandem, such as to identify ambient noise or to locate the source of sound in space of the physical setting.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical elements in the physical setting. Orientation sensor(s) 110 optionally include one or more gyroscopes and/or one or more accelerometers.

Various aspects of the present disclosure are directed to systems and techniques for providing (e.g., displaying) content to a user. In particular, examples described herein are directed to providing content to a user based on context, including context of a workspace within an XR environment. Generally, a workspace may be a virtual representation of any type of known workspace within an XR environment and serve to display a collection of items of content within the workspace. In some examples, a workspace is implemented in two dimensions. In other examples, the workspace is implemented in three dimensions. As described in more detail below, in some examples, a user may select one or more candidate items of content, and once selected, the selected candidate content may be included (e.g., added, displayed, etc.) in the workspace. In some examples, including content in this manner may include replacing other content in the workspace. Techniques described herein are implemented, at least in part, in some examples, using a digital assistant of an electronic device (e.g., device 100*a*). A digital assistant of the electronic device may, for instance, determine a context, provide (e.g., suggest) content to a user based on the context, and if the user selects any of the provided content, include selected content in the workspace.

FIGS. 2A-2E illustrate exemplary techniques for providing content based on a context of a workspace in some accordance with embodiments. Such techniques may be implemented using an electronic device, such as the electronic device 100*a* described above with reference to FIGS. 1A and 1B.

FIG. 2A illustrates workspace 202 displayed within XR environment 200. Generally, workspace 202 is a virtual representation of a workspace and serves as a spatial platform in which items of content may be displayed and/or aggregated. In some examples, workspace 202 is implemented as a virtual bulletin board in the XR environment such that items of content may be included and/or displayed in (e.g., spatially located on or proximate to) the workspace 202. As shown in FIG. 2A, for example, workspace 202 includes items 210*a-d* and 220*a-d* located in portions 212 and 222, respectively.

In some examples, workspace 202 is implemented as a two-dimensional virtual object having an area (e.g., height and width) on a spatial plane in the XR environment 200. In other examples, workspace 202 is implemented as a three-dimensional (3D) virtual object having a volume (e.g., height, width, depth) in the XR environment 200. In some examples, because the workspace 202 may be implemented as either a 2D or a 3D virtual object, items of content included in the workspace 202 may be positioned at different locations on an X-axis, Y-axis, and/or Z-axis. Accordingly, items of content may be positioned at any location and/or oriented in any manner relative to the workspace 202. In some examples, the location or orientation of workspace 202 within XR environment 200 may be adjusted by a user, and optionally, items of content within the workspace 202 may be adjusted in a similar manner such that the spatial relationships between the workspace 200 and items of content within workspace 200 is maintained. Additionally or alternatively, a user may select or modify one or more visual characteristics of each item of content. A user may select the color, size, shape, and/or specify one or more identifiers (e.g. label) for each item of content.

In some examples, items of content include one or more types of content. By way of example, content may include multimedia content, such as videos or images, and/or informational content, such as text or a code (e.g., QR code). Generally, each item of content may, optionally, include functionality allowing for use or manipulation of the item of content. An item of content may, for instance, include a hyperlink to a website associated with the item of content and/or an affordance for adjusting visual characteristics (e.g., size) of the item of content. In some instances, an item of content may serve as a thumbnail such that selection of the item of content allows a user to access additional information corresponding to the item of content.

In some examples, each item of content may be a virtual object associated with one or more entities, activities, and/or tasks. An entity may include but is not limited to a person, object, place, and organization. An activity may be an activity (e.g., event, occurrence, etc.) that a user and/or an entity may undertake. A task may be a task that a user and/or an entity may perform. Tasks may be performed, for instance, using the digital assistant and/or within the XR environment 200

By way of example, a first item of content may be associated with an event or task on a user's calendar (e.g., an appointment for an upcoming meeting). As another example, an item of content may be associated with an upcoming flight to Paris and display information regarding the flight and/or include a boarding pass for the flight. As yet another example, an item of content may be an actionable button for performing a task, such as adjusting a color of the workspace or deleting a selected item of content. As yet another example, an item of content may be a logo of a user's favorite football team. As yet another example, an item of content may be a contact (e.g., contact card) for a colleague or friend of the user. It will be appreciated that an item of content may include and/or represent any particular content and/or type of content.

In some examples, a user may include one or more items of content to the workspace 202. For example, a user may create an item of content, such as reminder for an appointment or a to-do list. As another example, a user may insert an existing a virtual object from another location of the XR environment 200 in the workspace 202 as an item of content. In moving the virtual object to the workspace 202, one or more visual properties of the virtual object may be adjusted. By way of example, the size and/or appearance (e.g., color) of the virtual object may be adjusted such that the virtual object better fits (e.g., shrinking a car) on the workspace 202 and/or is more visually discernible (e.g., prevent a white object from being placed on a white workspace). In some examples, items of content may be received from (e.g., donated by) other applications and added to the workspace 202. A restaurant reservation, for instance, may be provided by an application used for making reservations at restaurants and in response an item of content associated with the reservation may be added to the workspace 202. In additional or alternative embodiments, items of content may be included in workspace 202 automatically. For example, a user may book a plane ticket or book a hotel, or both, and items of content corresponding to the plane ticket and/or the hotel reservation may be automatically added (e.g., without additional user input) to workspace 202.

In some examples, a user may specify the manner in which items of content of the workspace 202 are arranged. For example, a user may arrange items of content spatially such that particular items of content are adjacent or proximate to one another. In some examples, items of content may be arranged by depth (e.g., same depth relative to the workspace 202). A user may, for instance, arrange items such that high-priority items appear closest to the perspective of a user in the XR environment 200. Items of content may further be arranged in a three-dimensional stack, such that only a top item of content in a stack is fully visible to a user viewing the workspace 202.

Additionally or alternatively, items of content may be organized based on associations between the items. By way of example, potential hotels for an upcoming trip may be arranged together in a first portion of a workspace, while potential events for the trip may be arranged together in a second portion of the workspace. The first and second portions may also be arranged together (e.g., closer together than portions for items unrelated to the trip) to indicate a common association with the upcoming trip. As yet another example, a user may use a workspace as a weekly schedule and events of each respective day may be assigned to a corresponding portion of the workspace (e.g., events for Sunday are grouped together, events for Monday are grouped together, and so on).

In some examples, the items of content may be automatically arranged based on associations between items of content and/or one or more content characteristics (e.g., content type, one or more entities, activities, and/or dates associated with content). A digital assistant of the electronic device may, for instance, determine that two or more items of content have a particular relationship and position and/or orient each of the items together in a particular portion of the workspace 202 based on the relationship between the items. For example, items of content related to a trip, such as plane tickets, hotel reservations, event reservations/tickets, potential hotels (such as hotels not booked but that the user may be considering), potential events (such as events not booked but that the user may be considering), a date, time, geographic location, activity type, etc., may be arranged together in a same portion of a workspace.

In some examples, content in the workspace 202 may be highlighted and/or other content may be filtered (e.g., by category, date, type, etc.). In this case, requested items of content (e.g., highlighted items, items of content not filtered out) may be presented in a prominent manner. For example, the requested items of content may be enlarged and/or reduced in depth within the XR environment 200 such that these items of content are displayed "over" the workspace.

As described, in some examples, candidate content may be provided based on context. Generally, context includes, but is not limited to, any information indicative of a previous, current, or future state of XR environment 200 and/or workspace 202. In some examples, context may include spatial context. Spatial context may indicate a relative location or orientation between the XR environment 200, workspace 202, and any number of items of content. In particular, spatial context may further indicate the manner in which one or more items of content are arranged within the workspace 202.

In some examples, spatial context may indicate an association between items of interest. With reference to FIG. 2A, for example, context may indicate that items 210a-d are associated with one another based on the relative proximity of items 210a-d in portion 212 and that items 220a-d are associated with one another based on the relatively proximity of items 220a-d in portion 222, respectively. In an example in which item 210a corresponds to ticket to fly to Paris and item 220b is a contact for a user, for instance, context may indicate that a user has an upcoming trip to Paris and the contact accompanying the user on the trip.

In some examples, context may include hierarchical context. Hierarchical context may indicate a hierarchical relationship between two or more items of content. As an example, an item of content for a utility bill may be hierarchically subordinate to an item of content for a reminder to pay bills. As another example, an item for a hotel restaurant reservation may be subordinate to an item of content for a hotel reservation.

In some examples, hierarchical relationships between items of content is indicated visually. Stacked items, for instance may in some cases be determined to have a hierarchical relationship. Consider, for instance, an example in which item 220a is associated with a first hotel and item 220b is associated with a second hotel. That item 220b is stacked on item 220a may indicate that item 220a is subordinate to item 220b (e.g., ranked lower), and as a result that the user would prefer to stay at the hotel associated with item 220b.

In some examples, context may include informational context. Informational context may include information about items of content, such as the date or time the items of content were created, the last time the items of content were accessed by a user, or how frequently the items of content are accessed. Informational context further may include information about a subject of (e.g., entity, activity, and/or event associated with) the items of content. Consider, for instance, an example in which each of the items 210a-d correspond to various aspects of an upcoming trip to Paris. Item 210a may, for instance, correspond to a ticket to fly to Paris and item 210b may correspond to a ticket to the Louvre. As a result, context may indicate that the user is interested in items of content pertaining to Paris, such as hotel reservations.

In some examples, context may include user context. User context may include information about the user and/or the manner in which the user is interacting with XR environment 200, workspace 202, and/or one or more items of content. As an example, user context may indicate a direction of user gaze, designating which, if any objects, of XR environment 200 a user is currently viewing. As another example, user context may indicate one or more inputs provided by a user, such as inputs received from an input device (e.g., mouse, controller). As yet another example, user context may indicate a location of a user (e.g., location in a real word environment).

In some examples, context may indicate an association between two or more sets of items of content, for instance, based on the spatial relationship (e.g., structural arrangements) of the sets of content. In some embodiments, the sets of content may be associated with a date, time, geographic location, activity type, or any combination thereof. With reference to FIG. 2A, for example, context may indicate that the set of items 220a-d are associated in some manner to the set of items 210a-d. Consider, for instance, an example in which items 210a-d correspond to various aspects of an upcoming trip to Paris, and items 220a-d correspond to a group of contacts associated with the user. In this example, the relative location of the two sets of content may indicate that or more of the contacts is associated with the trip in some manner (e.g., accompanying the user on the trip).

In some examples, context may be used to provide candidate items of content that may be of interest to a user. As described in more detail below, providing candidate items in this manner includes determining a context of the workspace 202 (and optionally, XR environment 200) and generating a plurality of candidate items of content based on the context. Each of the candidate items of content may, for instance, be a number of items of content considered to be relatively salient for a user. In some embodiments, candidate items of content may be identified by applying algorithms (e.g., machine learning algorithms) which may use the context to identify candidate items of content.

In some examples, a subset of the generated plurality of candidate items are provided to a user. A user may, for instance, be provided with a threshold number of top-ranked candidate items of content. Additionally or alternatively, a user may be provided only with candidate items of content satisfying a confidence threshold (e.g., a saliency score associated with an item of content satisfies a predetermined threshold). In embodiments, candidate content provided to a user may be provided according to a ranked order.

In some examples, salience of content may be determined based on prior user behavior. For example, a user may more often select items of content of a first type (e.g., booking restaurants) than items of content of a second type (e.g., adding contacts). In this case, items of content of the first type may be ranked higher than items of content of a second type (e.g., an item of content to book a restaurant reservation may be ranked higher than adding a contact).

In some examples, various types of context may be weighted according to respective parameters such more significant types of context are given more weight in identifying candidate items of content. For example, locations of items of content in a workspace may be considered more significant than the time at which the items of content were created. In some examples, weightings may be adjusted over time or user-specified.

In some examples, context may be used to disambiguate user inputs. As an example, a user may recite "delete it" when referencing one or more items of content of a workspace. Because it cannot be readily be determined which item of content was intended by the user based solely on the input, context may be used to disambiguate the input. By way of example, the digital assistant may determine, based on context of the workspace 202, that the last item of content a user interacted with was the intended item of content, or that an item of content currently in the gaze direction of the user was the intended item of content.

In some examples, content is provided to a user based on disambiguated inputs. By way of example, a user may recite, for instance, "book a nearby hotel for my trip". If the workspace includes items of content corresponding to trips to multiple destinations, the digital assistant may determine, based on context, which of the trips the user intended, and provide candidate items of content directed to hotel reservations for the trip intended by the user.

Generally, content provided to the user may include content of any type. In some examples, content provided to a user corresponds to (e.g., is associated with) one or more entities. For example, a workspace may include a group of contacts located in a first portion of the workspace and an item of content associated with a meeting located in a second portion of the workspace. If for instance, one or more of the contacts are attending the meeting, the user may be presented with items of content that may be used to invite other contacts in the group. In some examples, content provided to a user is associated with one or more activities. For example, if a user is planning a trip, context may indicate various aspects of the user's schedule during the trip as well as when the user is otherwise uncommitted. Accordingly, the user may be presented with items of content associated with one or more potential activities given the schedule and whereabouts of the user.

In some examples, content provided to a user corresponds to one or more activities. For example, a workspace may include items of content indicating that a user is planning a trip to Paris, and that the user is planning on staying at a particular hotel. In this case, the user may be presented with a candidate item of content associated with a dinner reservation at a restaurant nearby the hotel. In addition, additional candidate items of content may be presented to the user that may be used to purchase ticket to an entertainment event, for example a movie, the theater, etc., at a location nearby the restaurant, and at an appropriate time (e.g., at a time following dinner).

In some examples, content provided to a user corresponds to one or more tasks. For example, if context indicates that a user has 3 meetings associated with a same topic and the 2 of the meetings have been moved to a new location, the user may be presented with an item of content allowing the user to also move the third meeting.

Figure 2B:
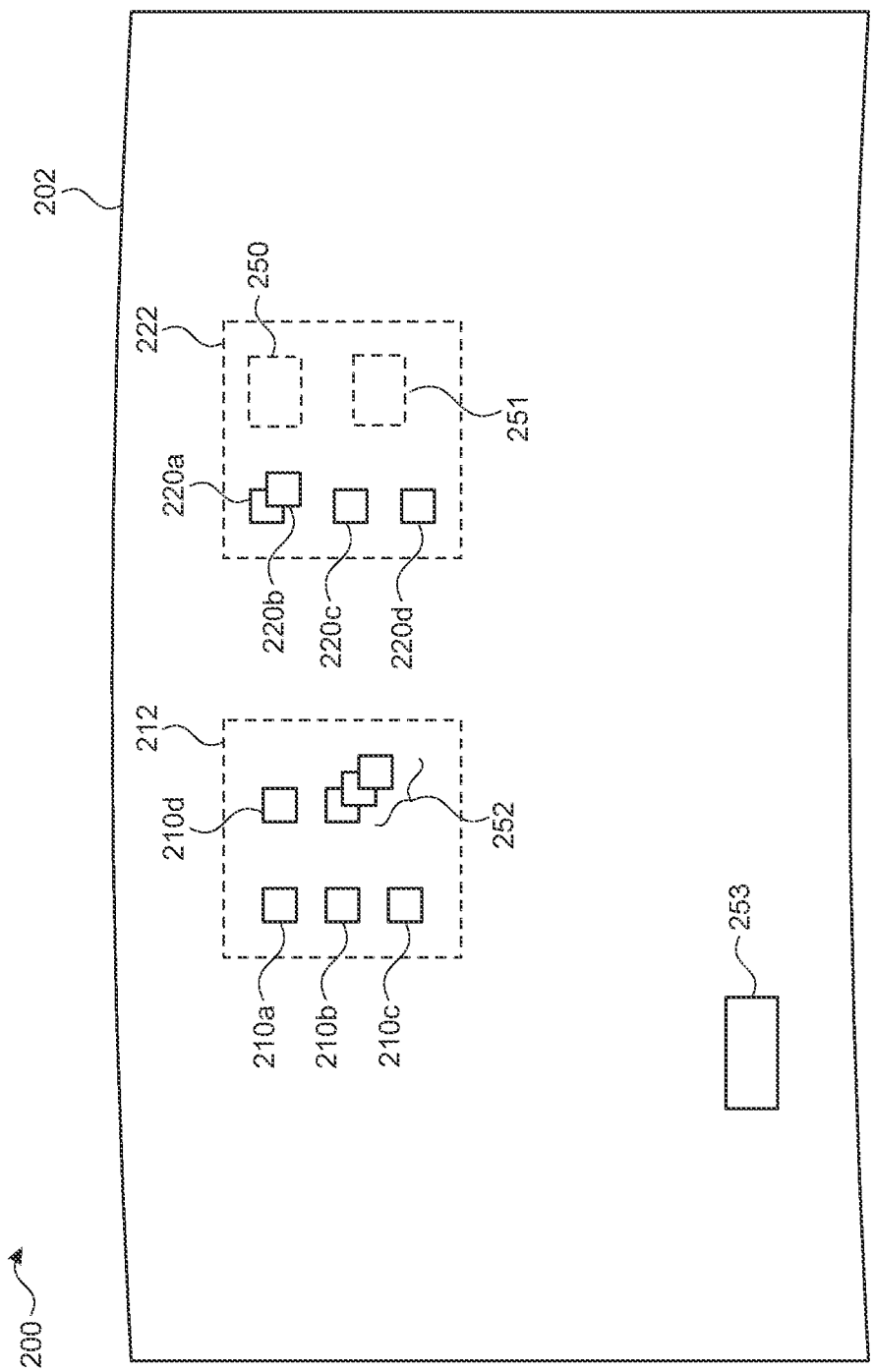
Figure 2D:
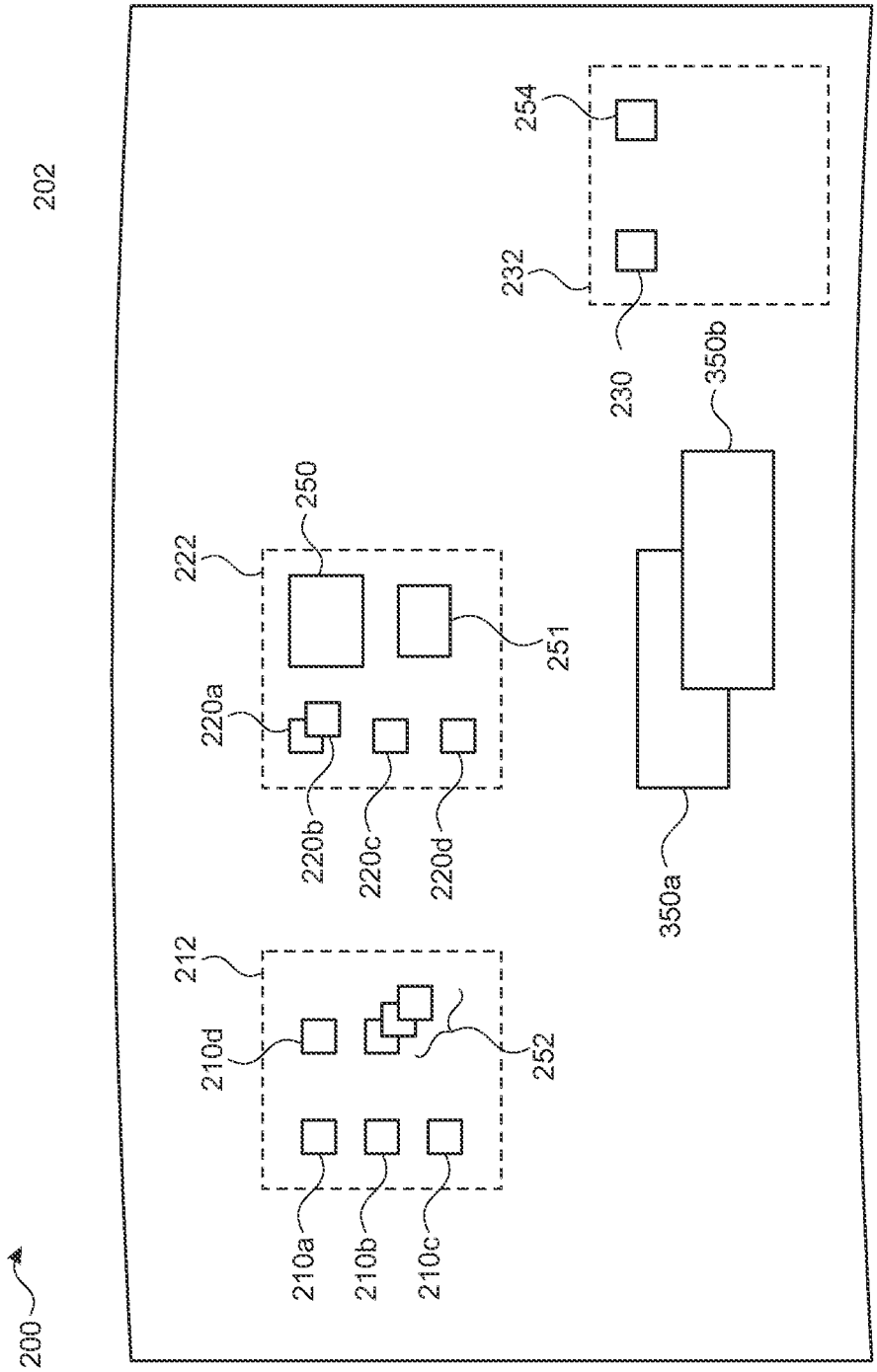
Figure 2E:
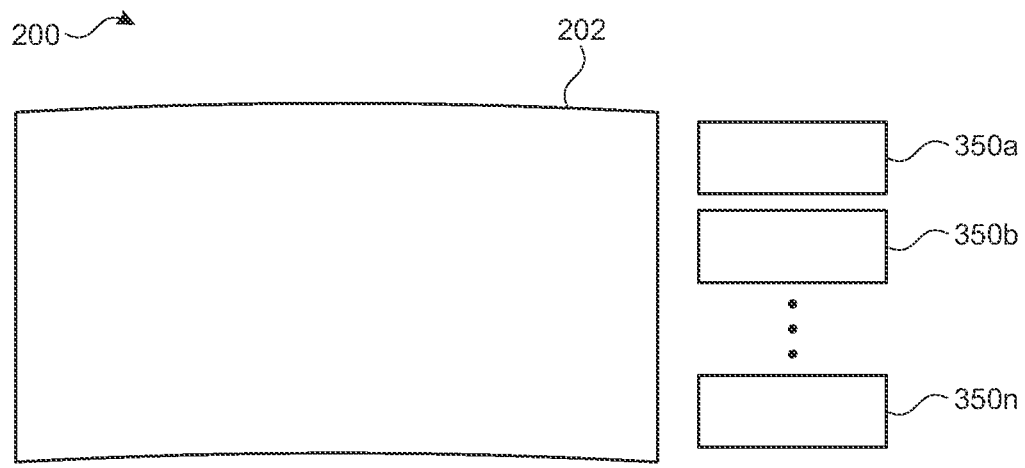
Figure 2F:
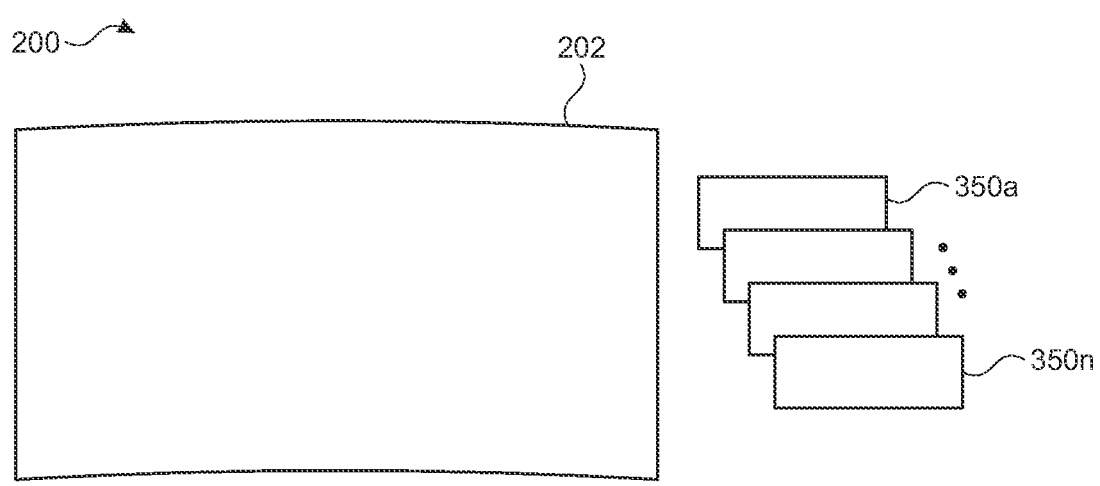

In some examples, candidate content may be provided within the workspace 202. With reference to FIG. 2B, candidate items of content 250, 251, and 252 may be displayed within portion 222 of workspace 202. In some examples content is provided to a user outside of the workspace 202. With reference to FIGS. 2E and 2F, for example, candidate items of content 350a-350n may be provided to a user outside of the workspace 202, for instance, as a list an unstacked list of candidate items (FIG. 2E) or a stacked list of candidate items (FIG. 2F).

In some examples, candidate items of content are displayed at a location adjacent or spatially proximate to items of contents included in the workspace 202. The provided content may be presented adjacent or spatially proximate, for instance, to those items of content considered to be most salient to the candidate items of content. For example, items of content 250, 251 may be provided based on a context determined, at least in part, from items 220a-220d within portion 222 (e.g., a context determined based on spatial arrangement and/or location of items 220a-220d). Accordingly, items of content 250, 251 may be provided (e.g., displayed) adjacent to items 220a-220d within portion 222. In this particular non-limiting example, item of content 250 may represent an item of content determined to be more relevant to items 220a and item 220b, and item of content 251 may represent an item of content determined to be more relevant to item 220c and 220d. As a result, item 250 may be displayed more proximate to items 220a, 220b, and item 251 may be displayed more proximate to items 220c, 220d.

Consider, for instance, an example in which each of items 220a, 220b correspond to respective contacts of a user, and items 220c, 220d correspond to a hotel reservation and movie reservation for a particular date, respectively. A context may be determined from the items 220a-d (and optionally, one or more other items of content), indicating that the user plans on staying at a particular hotel with the two persons, and plans on watching a movie the same day. Based on the context, the user may be provided with candidate items of content corresponding to a dinner reservation at a restaurant near the location of the hotel (e.g., item of content 250), or near the movie reservation (e.g., item of content 251), at a time that is appropriate given the movie reservation. In addition, the dinner reservation may include the two contacts associated with items 220a, 220b. As shown in FIG. 2B, the candidate items of content 250 and 251 may be displayed in proximity to items of content 220a-220d.

In some examples, candidate content is displayed in a structured manner. As shown in FIG. 2B, items of content 252 may be presented in a list (e.g., stacked list). In other examples, candidate items may be arranged in other manners, such as in horizontal rows or vertical columns. As described, in some examples candidate content may be ranked. Thus, in some examples, candidate content may be provided in a structured manner is ranked according to the ranking of the candidate content (e.g., highest ranked items at top of stack).

In some examples, candidate items of content may be provided (e.g., displayed) in a manner different than items of content included within workspace 202. For example, candidate items of content 250-252 may be displayed as ghosted (e.g., transparent, translucent) items. In another example, candidate items may be displayed in a color different than one or more items of content of the workspace 202 and/or may be otherwise highlighted in some manner. By presenting candidate items of content in a manner different than items of content within workspace 202, a user may more readily identify and distinguish the suggested items from those already included in workspace 202.

In some examples, candidate items of content are provided to a user in response to one or more user actions. In some examples, candidate items may be provided in response to activation of an affordance. With reference to FIGS. 2B-2C, the workspace 202 may include an affordance (e.g., selectable indicator) 253, which when selected by a user, causes one or more items of candidate content to be provided to a user.

In some examples, affordance 253 is selectively displayed in workspace 202. For example, affordance 253 may not be visible, or may be "ghosted" or transparent, unless ready for activation (e.g., when at least one candidate item of content has been identified but not yet displayed to the user). In some cases, suggestion button 253 may be visible before a suggested item of content is identified, but may change in appearance (e.g., may change color, may flicker, may change in size, etc.) once a suggested item of content is identified. In some embodiment, activating suggestion button 253 may cause candidate items of content to be displayed within workspace 202, as described above. In some examples, activating affordance 253 may include providing an input at a location of the affordance 253 (e.g., device 100a detects a direct interaction with the affordance 253 by the user), or may include providing a speech input for activating affordance 253 (e.g., "provide content suggestions") to the digital assistant of the electronic device. In some examples, activating affordance 253 may include gazing at affordance 253 for at least a predetermined amount of time. In some embodiments, affordance 253 may be displayed within workspace 202, as shown in FIG. 2B. In other embodiments, affordance 253 may be displayed outside of workspace 202. For example, as shown in FIG. 2C, affordance 253 may be displayed outside and adjacent to workspace 202.

In some examples, other user actions may cause candidate content to be provided to a user. Other actions causing candidate content to be provided include, but are not limited to, adding or modifying an item of content, spatially grouping items of content within a threshold distance of each other, and spatially grouping a threshold number of items of content together in a portion of the workspace. As an example, a user may create an item of content corresponding to a reminder to pay a bill on a particular day. In response to the user subsequently moving the item of content proximate to an item of content corresponding to a reminder to do laundry on the same day, the user may be provided with one or more candidate items of content corresponding to a to-list for the including tasks for paying the bill and doing laundry.

In some examples, candidate content is provided to a user automatically by the electronic device, or in particular, by the digital assistant of the electronic device. Candidate content may be provided for instance, in response to a change in context (e.g., context of workspace 202) or may be provided periodically.

Once candidate items have been provided to a user, the user may select one or more of the candidate items of content. In some examples, candidate items include selectable elements, and a user may select candidate items by interacting with the selectable element. A user may interact with selectable elements, for instance, by directly manipulating the selectable element, gazing at the selectable element for at least a predetermined amount of time, dragging the selectable item into the workspace, or any combination thereof. In some examples, selected items of content are dragged from a list of suggested items of content displayed outside of workspace 202 (e.g., as illustrated in FIGS. 2E and 2F) into a location within workspace 202. In some embodiments, interacting with the selectable element may include a voice command that indicates selection of the item of content. For example, a user may say "book it" to select an item of content representing a reservation.

Upon selection, the electronic device performs one or more tasks associated with the selected candidate item of content. In some examples, the task comprises including (e.g., adding, displaying) the selected items of content within workspace 202. In some examples, the appearance of one or more selected item may be adjusted to match the appearance of the items of content already within workspace 202. For example, as shown in FIG. 2D, upon selection of candidate items of content 252, items of content 252 may no longer be displayed as a candidate item, but rather as items of content of workspace 202 (e.g., may be opaque, may no longer be ghosted, transparent, or translucent, or may no longer flicker or glow). Similarly, upon selection of candidate items of content 250 and 251, items of content 250 and 251 may no longer be displayed as candidate items, but rather as items of content of workspace 202.

In some examples, a task associated with a selected candidate item of content depends on the item of content and/or the content of the item of content. For example, a task associated with a selected candidate item of content may include booking a reservation (e.g., a travel, dinner, hotel, event, etc.), adding, removing, calling a contact etc., ordering items, or simply adding items (e.g., photos, videos, documents, etc.) to the workspace.

In some examples, after a user selects a candidate item of content, the user confirms selection of the candidate item before the selected candidate item is included in the workspace 202. For example, upon the user selecting a candidate item of content, a confirmation dialog may be provided in the XR environment 200 and/or the workspace 202 requesting that the user confirm the selection. In some examples, a confirmation dialog may include an interactive element by which the user may provide the confirmation, and/or may include an interactive element via which the user may reject or cancel the selection. In the event that a user rejects or cancels a selection, the electronic device may cease display of the corresponding item of content.

In some examples, a candidate item of content may include information to aid in the user's understanding of the recommendation. Information may be provided for instance, that highlights an association between content of the workspace 202 and one or more candidate items of content. With reference to FIG. 2D, consider an example in which item of content 230 of the workspace 202 corresponds to a hotel reservation. As described, based on context of the workspace 202, a candidate item of content may be provided, such as the candidate item 254 corresponding to a restaurant reservation near the hotel. In addition to displaying the candidate item 254, the electronic device further may display a map 232 illustrating the relative location of the restaurant to the hotel. Each of the items of content 230, 254 may be positioned at locations corresponding to their locations on the map 232, for instance.

It will be appreciated that in some instances, including a candidate item of content in the workspace 202 may cause the context of the workspace 202 to be updated. For example, as described above, a context may be determined from items within workspace 202, and the context may be used to provide candidate items of content to a user for selection. Upon selection of at least one of the candidate items of content, the selected item of content may be included in workspace 202, and the inclusion of the selected item of content may result in an update to the determined context. The context may, for instance, be updated based on a spatial characteristic (e.g., location) of the selected item. The updated context may then be used to provide subsequent candidate items of content.

Figure 3:
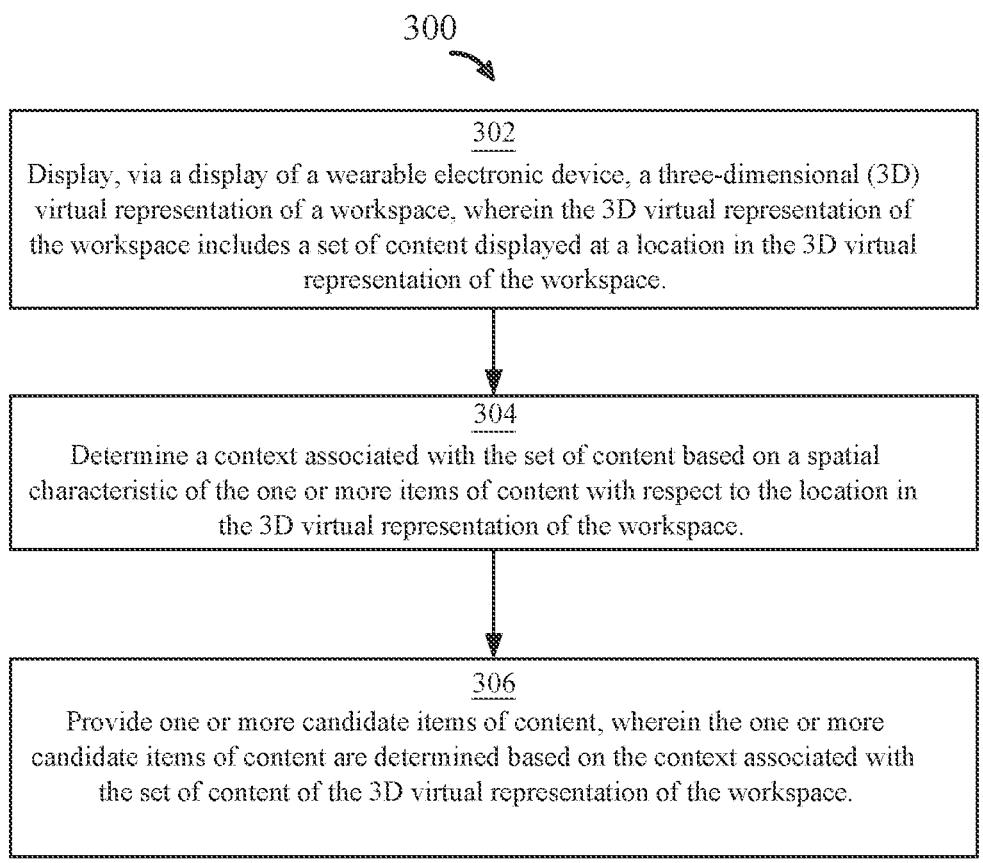
FIG. 3 is a flow diagram illustrating a method for providing content in accordance with some embodiments.

FIG. 3 is a flow diagram illustrating method 300 for providing content based on a context of a workspace in accordance with some embodiments. In some embodiments, method 300 may be performed by an electronic device, such as electronic device 100a described above with reference to FIGS. 1A and 1B.

At block 302, a three-dimensional (3D) virtual representation of a workspace is displayed via a display of a wearable electronic device. For example, an electronic device, such as electronic device 100a, may be used to display and/or otherwise present a 3D virtual representation of a workspace, such as workspace 202 described above with reference to FIGS. 2A-2D. In some embodiments, the 3D virtual representation of the workspace may be presented to the user via a translucent display of the electronic device or pass-through video. In other embodiments, the 3D virtual representation of the workspace may be a computer-generated simulation displayed on a display of the electronic device. In embodiments, the 3D virtual representation of the workspace includes a set of content displayed at a location in the 3D virtual representation of the workspace and including one or more items of content.

In some embodiments the set of content includes items of a first type and items of a second type. In some cases, the items of the first type may be spatially grouped in a first region of the 3D virtual representation and the items of the second type may be spatially grouped in a second region of the 3D virtual representation that is different from the first region. In embodiments, the items of the set of content may be grouped based on date, time, geographic location, activity type, or any combination thereof.

At block 304, a context associated with the set of content is determined based on a spatial characteristic of the one or more items of content with respect to the location of the set of content in the 3D virtual representation of the workspace. For example, in some embodiments, a spatial characteristic of the one or more items may include a position of an item of content relative to the position of another item of content. In some embodiments, the spatial characteristic may be determined to indicate a relationship between the items of content.

In some embodiments, determining the context may include determining the context based on a location of a first item that is grouped with other items of content within a first region of the 3D virtual representation of the workspace relative to a location of a second item that is also grouped within the first region. In some embodiments, determining the context may include determining the context based on a location of a first item that is grouped within a first region of the 3D virtual representation of the workspace relative to a location of a second item that is grouped within a second region different from the first region. In some embodiments, determining the context may include determining the context based on a location of a first group of items of content (e.g., items grouped within a first region of the workspace) relative to a location of a second group of items of content (e.g., items grouped within a second region of the workspace).

At block 306, one or more candidate items of content may be provided. In embodiments, the one or more candidate items of content may be determined based on the context associated with the set of content of the 3D virtual representation of the workspace (e.g., the context determined at block 304). In embodiments, the one or more candidate items of content may be provided by a digital assistant.

In some embodiments, providing the one or more candidate items of content may include displaying the candidate items of content within the 3D virtual workspace, and/or may include providing a selectable indicator (e.g., suggestion button 253 described above with respect to FIGS. 2B and 2C). In embodiments, the one or more candidate items of content may be displayed adjacent to at least one item of the set of content displayed at the location in the 3D virtual representation of the workspace.

In embodiments, displaying at least one item of the one or more candidate items of content may include displaying the at least one item of the one or more candidate items of content as a ghosted, transparent, and/or translucent item. In some embodiments, in response to receiving a user input indicating selection of the at least one item of the one or more candidate items of content, the display of the at least one item of the one or more candidate items of content as a ghosted, transparent, and/or translucent item may be ceased. In this case, upon selection, the at least one item of the one or more candidate items of content may be displayed as an opaque item. In embodiments, in response to receiving a user input indicating rejection of the at least one item of the one or more candidate items of content, the display of the at least one item of the one or more candidate items of content may be ceased.

In some embodiments, the one or more candidate items of content may be ranked. In this case, providing the one or more candidate items of content may include displaying at least a subset of the one or more candidate items of content in an order according to a rank of items in the subset. In embodiments, the subset of the one or more candidate items of content may include a threshold number of top-ranked items of the plurality of items.

As noted above, providing the one or more candidate items of content may include providing a selectable indicator (e.g., affordance 253 described above with respect to FIGS. 2B and 2C). In embodiments, the selectable indicator may be provided and/or displayed within the 3D virtual representation of the workspace, or may be displayed outside of the 3D virtual representation of the workspace. The selectable indicator may indicate that a suggestion of the one or more candidate items of content is available. In some embodiments, a user selection of the selectable indicator may be received and, in response to receiving the user selection of the selectable indicator, the one or more candidate items of content may be displayed.

In embodiments, receiving the user selection of the selectable indicator may include determining that a user's gaze is directed at the selectable indicator for at least a predetermined period of time. In some embodiments, receiving the user selection of the selectable indicator may include detecting a direct interaction by the user with the selectable indicator.

In embodiments, a user selection of at least one candidate item of content of the one or more candidate items of content may be received. In response to receiving the selection of the candidate item of content, a task associated with the selected candidate item of content may be performed. In embodiments, performing the task associated with the selected candidate item of content may include displaying the selected candidate item of content in the 3D virtual representation of the workspace.

In embodiments, prior to displaying the selected candidate item of content in the 3D virtual representation of the workspace, a request for a user confirmation that the selected candidate item of content is to be added to the 3D virtual representation of the workspace may be prompted. In these cases, the selected candidate item of content may be displayed in the 3D virtual representation of the workspace in accordance with receiving the user confirmation. In some embodiments, in response to receiving the user selection of the at least one candidate item of content, the context associated with the set of content may be updated to include a context additionally based on a spatial characteristic of the selected candidate item of content.

As described above, one aspect of the present technology is the gathering and use of data available from various sources to provide specialized resource management of low-power devices with additive displays (e.g., HMD devices with additive displays) to conserve battery life for users and to provide specialized content to users of the low-power devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to conserve battery life of a user's low-power device. Accordingly, for example, the use of such personal information data enables the system to properly manage resources to conserve battery life for the low-power devices. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of managing resources for low-powered devices, the present technology can be configured to allow users to select to "opt in" or "opt out" of participation in the collection of personal information data during registration for services or anytime thereafter. In another example, users can select not to provide eye tracking data, such as pupil location, pupil dilation, and/or blink rate for specialized resource management. In yet another example, users can select to limit the length of time the eye tracking data is maintained or entirely prohibit the development of a baseline eye tracking profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, resources of low-powered devices can be managed and content (e.g., status updates and/or objects) can be selected and delivered to users by inferring preferences based on non-personal information data or a bare minimum amount of personal information, such as the content being requested by the device associated with a user, other non-personal information available to the system controlling the low-power device, or publicly available information.

What is claimed is:

1. A wearable electronic device, comprising:
  a display;
  one or more processors; and
  memory storing one or more programs configured to be executed by the one or more processors, the one or more programs including instructions for:
    displaying, via the display of the wearable electronic device, a virtual representation of a workspace, wherein the virtual representation of the workspace includes;
      a first set of content displayed at a first location in the virtual representation of the workspace, the first set of content including a first set of one or more items of content; and
      a second set of content displayed at a second location in the virtual representation of the workspace, the second set of content including a second set of one or more items of content;
    determining a first context associated with the first set of content based on a first spatial characteristic of the first set of one or more items of content with respect to the first location of the first set of content in the virtual representation of the workspace;
    providing a first set of one or more candidate items of content, wherein the first set of the one or more candidate items of content are determined based on the first context associated with the first set of content of the virtual representation of the workspace;
    determining a second context associated with the second set of content based on a second spatial characteristic of the second set of one or more items of content with respect to the second location of the second set of content in the virtual representation of the workspace; and
    providing a second set of one or more candidate items of content, wherein the second set of the one or more candidate items of content are determined based on the second context associated with the second set of content of the virtual representation of the workspace.

2. The wearable electronic device of claim 1, the one or more programs further including instructions for:
  receiving a user selection of at least one candidate item of content of the first set of one or more candidate items of content; and
  performing a task associated with the selected at least one candidate item of content.

3. The wearable electronic device of claim 1, wherein the first set of content includes items of a first type and items of a second type, and wherein the items of the first type are spatially grouped in a first region of the virtual representation and items of the second type are spatially grouped in a second region of the virtual representation different than the first region, and wherein determining the first context includes determining the first context based on a location of a first item in the first region relative to a location of a second item in the first region within the virtual representation of the workspace.

4. The wearable electronic device of claim 1, wherein determining the first context includes determining the first context based on a location of a third set of content relative to a location of a fourth set of content within the virtual representation of the workspace.

5. The wearable electronic device of claim 1, wherein providing the first set of the one or more candidate items of content includes:
   providing a selectable indicator, within an extended reality (XR) environment, indicating that a suggestion of the one or more candidate items of content is available;
   receiving a user selection of the selectable indicator; and
   in response to receiving the user selection of the selectable indicator, displaying the first set of the one or more candidate items of content.

6. The wearable electronic device of claim 1, wherein providing the first set of the one or more candidate items of content includes displaying at least one item of the first set of the one or more candidate items of content adjacent to at least one item of the first set of content displayed at the first location in the virtual representation of the workspace.

7. The wearable electronic device of claim 1, wherein the virtual representation is a three-dimensional (3D) representation.

8. The wearable electronic device of claim 1, wherein determining the first context includes determining the first context based on a depth of the first set of the one or more items of content.

9. A non-transitory computer-readable storage medium storing one or more programs configured to be executed by one or more processors of a wearable electronic device including a display, the one or more programs including instructions for:
   displaying, via the display of the wearable electronic device, a virtual representation of a workspace, wherein the virtual representation of the workspace includes:
      a first set of content displayed at a first location in the virtual representation of the workspace, the first set of content including a first set of one or more items of content; and
      a second set of content displayed at a second location in the virtual representation of the workspace, the second set of content including a second set of one or more items of content;
   determining a first context associated with the first set of content based on a first spatial characteristic of the first set of one or more items of content with respect to the first location of the first set of content in the virtual representation of the workspace;
   providing a first set of one or more candidate items of content, wherein the first set of the one or more candidate items of content are determined based on the first context associated with the first set of content of the virtual representation of the workspace;
   determining a second context associated with the second set of content based on a second spatial characteristic of the second set of one or more items of content with respect to the second location of the second set of content in the virtual representation of the workspace; and
   providing a second set of one or more candidate items of content, wherein the second set of the one or more candidate items of content are determined based on the second context associated with the second set of content of the virtual representation of the workspace.

10. The non-transitory computer-readable storage medium of claim 9, the one or more programs further including instructions for:
   receiving a user selection of at least one candidate item of content of the first set of one or more candidate items of content; and
   performing a task associated with the selected at least one candidate item of content.

11. The non-transitory computer-readable storage medium of claim 9, wherein the first set of content includes items of a first type and items of a second type, and wherein the items of the first type are spatially grouped in a first region of the virtual representation and items of the second type are spatially grouped in a second region of the virtual representation different than the first region, and wherein determining the first context includes determining the first context based on a location of a first item in the first region relative to a location of a second item in the first region within the virtual representation of the workspace.

12. The non-transitory computer-readable storage medium of claim 9, wherein determining the first context includes determining the first context based on a location of a third set of content relative to a location of a fourth set of content within the virtual representation of the workspace.

13. The non-transitory computer-readable storage medium of claim 9, wherein providing the first set of the one or more candidate items of content includes:
   providing a selectable indicator, within an extended reality (XR) environment, indicating that a suggestion of the one or more candidate items of content is available;
   receiving a user selection of the selectable indicator; and
   in response to receiving the user selection of the selectable indicator, displaying the first set of the one or more candidate items of content.

14. The non-transitory computer-readable storage medium of claim 9, wherein providing the first set of the one or more candidate items of content includes displaying at least one item of the first set of the one or more candidate items of content adjacent to at least one item of the first set of content displayed at the first location in the virtual representation of the workspace.

15. The non-transitory computer-readable storage medium of claim 9, wherein the virtual representation is a three-dimensional (3D) representation.

16. The non-transitory computer-readable storage medium of claim 9, wherein determining the first context includes determining the first context based on a depth of the first set of the one or more items of content.

17. A method, comprising:
   at a wearable electronic device with a display:
      displaying, via the display of the wearable electronic device, a virtual representation of a workspace, wherein the virtual representation of the workspace includes:
         a first set of content displayed at a first location in the virtual representation of the workspace, the first set of content including a first set of one or more items of content; and
         a second set of content displayed at a second location in the virtual representation of the workspace, the second set of content including a second set of one or more items of content;
      determining a first context associated with the first set of content based on a first spatial characteristic of the first set of one or more items of content with respect to the first location of the first set of content in the virtual representation of the workspace;

providing a first set of one or more candidate items of content, wherein the first set of the one or more candidate items of content are determined based on the first context associated with the first set of content of the virtual representation of the workspace;

determining a second context associated with the second set of content based on a second spatial characteristic of the second set of one or more items of content with respect to the second location of the second set of content in the virtual representation of the workspace; and providing a second set of one or more candidate items of content, wherein the second set of the one or more candidate items of content are determined based on the second context associated with the second set of content of the virtual representation of the workspace.

18. The method of claim 17, further comprising:
receiving a user selection of at least one candidate item of content of the first set of one or more candidate items of content; and
performing a task associated with the selected at least one candidate item of content.

19. The method of claim 17, wherein the first set of content includes items of a first type and items of a second type, and wherein the items of the first type are spatially grouped in a first region of the virtual representation and items of the second type are spatially grouped in a second region of the virtual representation different than the first region, and wherein determining the first context includes determining the first context based on a location of a first item in the first region relative to a location of a second item in the first region within the virtual representation of the workspace.

20. The method of claim 17, wherein determining the first context includes determining the first context based on a location of a third set of content relative to a location of a fourth set of content within the virtual representation of the workspace.

21. The method of claim 17, wherein providing the first set of the one or more candidate items of content includes:
providing a selectable indicator, within an extended reality (XR) environment, indicating that a suggestion of the one or more candidate items of content is available;
receiving a user selection of the selectable indicator; and
in response to receiving the user selection of the selectable indicator, displaying the first set of the one or more candidate items of content.

22. The method of claim 17, wherein providing the first set of the one or more candidate items of content includes displaying at least one item of the first set of the one or more candidate items of content adjacent to at least one item of the first set of content displayed at the first location in the virtual representation of the workspace.

23. The method of claim 17, wherein the virtual representation is a three-dimensional (3D) representation.

24. The method of claim 17, wherein determining the first context includes determining the first context based on a depth of the first set of the one or more items of content.

* * * * *

UNITED STATES PATENT AND TRADEMARK OFFICE
CERTIFICATE OF CORRECTION

PATENT NO. : 12,118,182 B2
APPLICATION NO. : 18/153198
DATED : October 15, 2024
INVENTOR(S) : Aaron M. Burns et al.

Page 1 of 1

It is certified that error appears in the above-identified patent and that said Letters Patent is hereby corrected as shown below:

In the Claims

In Column 18, Line 22, Claim 1, delete "includes;" and insert -- includes: --, therefor.

Signed and Sealed this
Eighteenth Day of March, 2025

Coke Morgan Stewart
*Acting Director of the United States Patent and Trademark Office*